March 3, 1970

D. W. ROPER 3,498,272

ENGINE ACCESSORY DRIVE

Filed Feb. 1, 1968

INVENTOR.
DANIEL W. ROPER
BY
Young, Flynn & Jarolli
ATTORNEYS

United States Patent Office 3,498,272
Patented Mar. 3, 1970

3,498,272
ENGINE ACCESSORY DRIVE
Daniel W. Roper, Rochester, Mich., assignor to Eaton Yale & Towne Inc., Cleveland, Ohio, a corporation of Ohio
Filed Feb. 1, 1968, Ser. No. 702,341
Int. Cl. F01p 7/02, 1/06, 7/10
U.S. Cl. 123—41.12          11 Claims

ABSTRACT OF THE DISCLOSURE

A viscous fluid coupling is associated with an internal combustion engine of a vehicle, and specifically is mounted remotely from the axis of rotation of a water pump impeller and radiator cooling fan driven from the viscous fluid coupling. The coupling is, however, mounted within the air stream created by the rotation of the fan blades and, specifically, is located adjacent the alternator of the vehicle.

---

Figure 1:
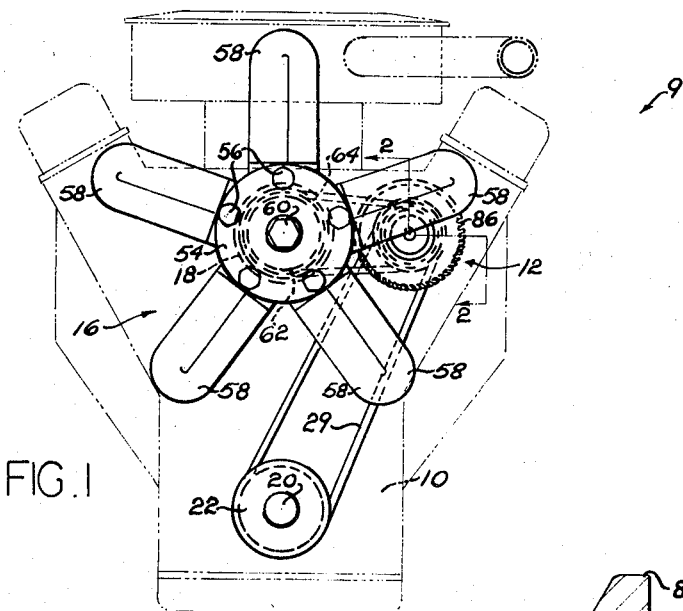

The present invention relates to a drive for vehicle accessories, and particularly to a drive for a radiator cooling fan of an internal combustion engine.

Presently, fluid couplings are widely used in association with internal combustion engines, and particularly for driving radiator cooling fans and adjacent coaxial water pump impellers. The fluid couplings are generally of the type that utilize silicon fluid as a viscous drive fluid to effect rotation of an output member upon rotation of an input member. Generally, the fluid coupling is mounted on the radiator cooling fan and water pump impeller shaft and driven by a belt arrangement from the crankshaft. The fluid coupling is generally directly at the center of the radiator cooling fan and is thus not in the direct air stream provided by the rotating fan blades. Moreover, the coupling is driven at a relatively low speed so that the output speed is relatively low to minimize water pump cavitation problems created by high speed operation thereof. As a result, any heat dissipation due to rotation of the fluid coupling itself is minimized and thus heat dissipation is inefficient.

Accordingly, the principal object of the present invention is the provision of a new and improved fan drive utilizing a viscous shear fluid coupling for transmitting torque from the crankshaft of the engine to the radiator cooling fan, and wherein the dissipation of heat from the viscous coupling is effected in an extremely efficient and reliable manner.

A further object of the present invention is the provision of a new and improved fan drive for a radiator cooling fan accessory of an internal combustion engine which includes a viscous coupling driven from the crankshaft of the engine and located remotely from the axis of rotation of the fan but in the air stream created by the blades of the fan for effecting cooling of the viscous coupling.

A still further object of the present invention is the provision of a new and improved fan drive wherein the input member of a viscous coupling for driving the fan is mounted remotely with respect to the fan and specifically is drivingly connected with a shaft for driving another accessory of the vehicle and which accessory is driven at a relatively high speed, and thus the construction takes full advantage of dissipation of heat from the viscous coupling due to rotation of the viscous coupling itself.

Another object of the present invention is the provision of a new and improved accessory drive for a radiator cooling fan and water pump impeller and which drive includes a viscous shear-type fluid coupling mounted within the air stream created by the rotating blades of the cooling fan and spaced from the axis of rotation of the fan to provide flexibility in the drive ratio therebetween.

A further object of the present invention is the provision of a new and improved drive for a radiator cooling fan device and a coaxial impeller element of a water pump and which drive includes a fluid coupling mounted coaxially with an alternator and includes an input member driven at the input speed of the alternator.

Still another object of the present invention is the provision of a new and improved engine accessory drive which includes a viscous fluid coupling having an input member mounted coaxially with an alternator drive shaft and driven from the crankshaft at the same rotational speed as the alternator drive shaft, and an output member drivingly connected to an engine accessory to drive the accessory.

Figure 2:
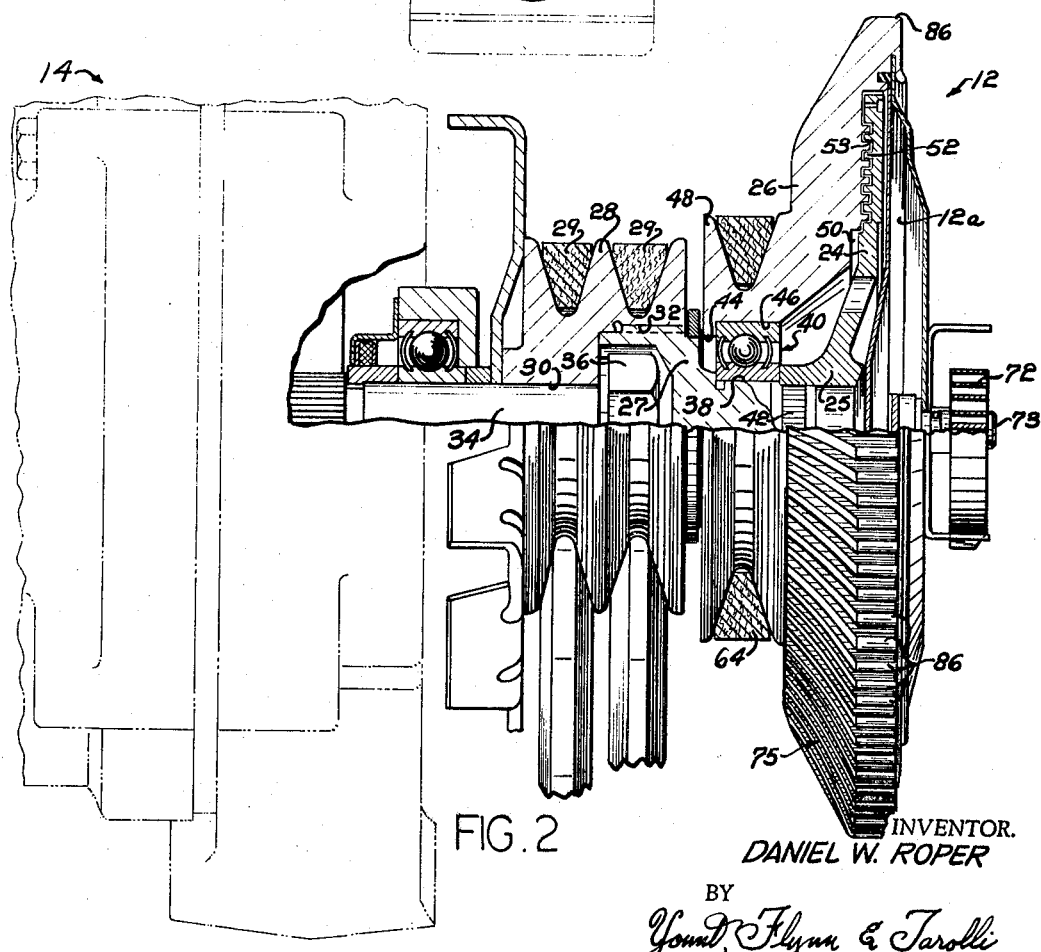

Further objects and advantages of the present invention will be apparent to those skilled in the art to which it relates from the following detailed description thereof made with reference to the accompanying drawing forming a part of this specification and wherein:

FIG. 1 is an elevational view of an internal combustion engine illustrating a cooling fan, fluid coupling, and associated belt connections; and FIG. 2 is an enlarged axial sectional view, taken approximately along the section line 2—2 of FIG. 1.

The present invention provides an improved engine accessory drive, and particularly a drive for a radiator cooling fan for an internal combustion engine of a vehicle. The drive includes a viscous fluid coupling driven from the engine crankshaft and mounted for highly efficient heat dissipation. As representative of the present invention, FIG. 1 illustrates an internal combustion engine 9.

The engine 9 includes an engine block 10. A fluid coupling 12, an associated alternator 14, a radiator cooling fan 16, and a water pump impeller 18 are all mounted in association with the engine block 10. The engine block 10 comprises conventional crankshaft bearings, and a crankshaft 20 is journaled therein and has one end thereof extending externally of the engine block 10. A dual drive pulley 22 is fitted on the external end of the crankshaft 20.

The fluid coupling 12 is drivingly connected with the crankshaft 20 and is driven therefrom. The alternator 14 is likewise driven from the crankshaft. The radiator cooling fan 16 and the water pump impeller 18 are driven from the fluid coupling 12. These various accessory devices are interconnected by drive belts, to be described hereinbelow, providing the desired drive ratios therebetween.

The fluid coupling 12 includes an input coupling member 24 and an output coupling member 26. The input coupling member 24 is a disk-like member having a splined hub portion 25. The input coupling member 24 has associated therewith a sleeve 27 and a dual pulley 28. The dual pulley 28 has a center bore 30 therethrough and a concentric counterbore 32 therein. The pulley 28 is secured for rotation with the alternator shaft 34 by a nut 36 which is screwed onto the threaded end of the shaft 34 within the counterbore 32. The dual pulley 28 is driven from the crankshaft pulley 22 by belts 29.

The sleeve 27 is drivingly connected with the pulley 28 and is shown splined and secured thereto within counterbore 32 for rotation with the pulley 28. Part of the hub portion of sleeve 27 is a journal 38 which supports bearing means 40. An additional axial portion 42 of the sleeve 27 is splined to receive the splined hub portion 25 of input coupling member 24. In this manner, the input coupling member 24 is rotated from the crankshaft 20 through the pulley 28 and sleeve 27.

The output coupling member 26 comprises a housing member. The output coupling member 26 is concentric to and in juxtaposition with the input coupling member 24. The output coupling member 26 has a center through bore 44 and a counterbore 46 therein adapted to receive bearing means 40 which supports the output member 26 for rotation relative to the sleeve 27 and input member 24. The output coupling member 26 is rotatably supported on the journal portion 38 of sleeve 27 by the bearing means 40 therebetween. The output member 26 has the periphery of its hub portion defining a pulley 48.

The coupling members 24, 26 define therebetween a fluid shear chamber 50. Fluid located in the chamber 50 transmits torque between the coupling members 24, 26. The fluid is sealed from leakage from chamber 50 by suitable seals that are associated with the bearing means 40 and sleeve 27. The back side of disk-like member 24 and the juxtaposed front side of output member 26 each have a plurality of radially spaced concentric interdigitated annular lands and grooves 52, 53, respectively, adapted to be cooperatively intermeshed in the fluid filled chamber 50 to effect transmission of torque from the input member 24 to the output member 26 by the action of the shear fluid, as is known.

The fluid coupling 12 is mounted adjacent the alternator 14 and, specifically, the sleeve 27 rotates about an axis which is an extension of the axis of the shaft 34 which constitutes the input or drive shaft for the alternator 14. The input shaft 34 of the alternator is driven directly from the pulley 28 which is drivingly connected thereto. It should be apparent, therefore, that the drive pulley 28 which is driven directly from the crankshaft 20 of the engine by the belts 29, in turn, effects simultaneous driving of the input shaft 34 of the alternator 14 and the input member 24 of the viscous drive coupling 12. The alternator 14 is driven at a relatively high ratio with respect to the crankshaft 20 of the engine and, as a result, the rotational speed of the input member of the viscous coupling 12 is higher than that of the crankshaft and in the order of 3 to 1.

As is well known to those skilled in the fluid coupling art, the amount of torque transmitted from the input member 24 to the output member 26 is a function of the volume of the fluid in the above-mentioned shear spaces defined by the lands and grooves 52, 53. In the event fluid is not located in any of the shear spaces, no torque is transmitted between the input and output members 24, 26. On the other hand, when fluid fills or partially fills the shear chamber or space 50, torque is transmitted therebetween.

In order to vary the volume of fluid in the shear spaces and thus vary the torque transmitted and the speed differential between the input and output coupling members 24, 26, the fluid coupling 12 includes a means providing for fluid flow into and out of the shear space 50. The means providing for fluid flow into and out of the shear space 50 may be of any form and reference is made to United States Letters Patent 3,055,473, issued Sept. 25, 1962, for a specific description of a suitable mechanism for varying the volume of fluid in the shear space 50, which mechanism may be used herein.

For purposes of this application, it should suffice to say that the mechanism for providing for fluid flow includes fluid conducting passage means communicating a reservoir chamber 12a with the shear space 50 for conducting fluid into and from the shear chamber 50. The mechanism to effect flow between the chambers 50 and 12a includes a helically wound, bimetallic temperature-responsive coil means 72. One end of the helically wound, bimetallic temperature-responsive coil means 72 is positioned in a slot formed in a stub shaft 73. The bimetallic coil 72 is responsive to changes in temperature to effect rotation of stub shaft 73 which, in turn, effects fluid flow between the chambers 50 and 12a in a well-known manner, as described in the afore-mentioned patent.

The fluid coupling 12 is provided with a large cooling fin area for extremely effective dissipation of the heat produced by the transmission of torque between the coupling members 24, 26. To this end, the coupling member 26 includes fin means 75 for dissipating the heat produced by the transmission of torque between the coupling members.

The coupling 12 further includes blower blade means for providing a flow of air around the coupling 12 and across the temperature-responsive coil means 72 to prevent stagnation of air in the region of the temperature-responsive coil means 72 and thereby render the latter more responsive to actual temperature changes and not responsive to restricted or trapped temperatures which are not indicative of the temperature surrounding the coupling 12 as a whole. The blower blade means preferably comprises a plurality of blower blade members 86 extending radially outwardly of the temperature-responsive coil means 72. The blower blade members 86 and the fin members 75 are preferably formed integrally with the coupling member 26 and as a one-piece casing providing effective heat dissipation means and yet being easily manufactured. For a more detailed description of the blower blade construction, reference may be made to United States Letters Patent 3,272,292.

The output member 26 of the viscous coupling 12 is drivingly connected to the radiator cooling fan 16 to effect driving thereof. The radiator cooling fan 16 comprises a disk-like support member 54 secured to a suitable fan drive shaft 60. The disk-like support member 54 has a plurality of fan blades 58 secured thereto by bolts 56. The fan blades 58 extend radially outwardly from the periphery of the disk-like support member 54. Rotation of the shaft 60 effects rotation of the fan blades 58.

The water pump impeller 18 is keyed to the fan shaft 60 for rotation therewith. Also keyed to shaft 60 between the fan 16 and water pump impeller 18 is a pulley 62 driven by a fan belt 64 which is rotated by the pulley 48 of the output coupling member 26. The belt 64 drives the pulley 62, which in turn drives shaft 60, fan 16, and impeller 18. In order to reduce cavitation problems in the water pump, the drive ratio between the output coupling member 26 and the fan 16 and water pump impeller 18 is such that the rotational speed of the fan 16 and water pump impeller 18 is lower than the rotational speed of the alternator 14 and output coupling member 26. The ratio is in the order of 1:2 and, as should be apparent, could be otherwise. In view of the fact that the viscous coupling 12 is remote from the fan 16, there is flexibility in the drive ratio provided therebetween. This drive ratio may be varied as well as the size of the viscous coupling 12 to provide any desirable drive relationship.

The viscous drive coupling 12, as should be apparent from FIG. 1, is mounted in the air stream provided by rotation of the fan 16. More specifically, the outer tips of the fan blades 58 extend beyond the coupling 12 and thus on rotation provide an air stream which envelopes the coupling 12. Moreover, the viscous drive coupling 12 is mounted in association with the alternator 14, which is rotated at a relatively high speed as compared to the speed of rotation of the fan 16. These two facts provide for effective heat dissipation from the fluid coupling. The fact that the fluid coupling 12 is mounted in the air stream provided by the fan 16 which is driven by the fluid coupling 12 results in a high volume of air flow around the fluid coupling 12 providing effective heat dissipation. Moreover, the fact that the fluid coupling 12 is mounted in association with the alternator 14 and thus is driven at a relatively high speed as compared to the speed at which it would be driven if it were mounted in association with the fan 16 provides for more effective use of the blower blades 86. As a result, the blower blades 86 operate at a relatively high speed providing a more effective heat dissipation. Furthermore, in view of the high speed of the input member 24 of the coupling the required output speed can be achieved by a viscous coupling of smaller construction that one where the input speed was lower.

What is claimed is:

1. A drive for rotating a cooling fan accessory for an engine from a crankshaft of the engine, said drive comprising rotatable shaft means drivingly connected with the fan accessory to effect rotation thereof to create an air stream, a drive coupling comprising a viscous fluid coupling, means mounting said drive coupling at a location spaced from the axis of rotation of said shaft means but within the air stream created by rotation of said fan accessory, said drive coupling comprising an input coupling member to be driven from the crankshaft of the engine and an output coupling member, and means for drivingly connecting said output coupling member and said shaft means to effect rotation of said shaft means upon rotation of said output coupling member said input and output members defining a shear space therebetween in which viscous fluid is adapted to be located to effect transmission of torque between said input and output coupling members.

2. A drive as defined in claim 1 further including a water pump impeller drivingly connected with said shaft means for rotation therewith whereby said viscous fluid coupling effects rotation of the water pump impeller and the fan accessory.

3. A drive as defined in claim 2 wherein the drive ratio between said viscous fluid coupling and said crankshaft is greater than 1 so that said input coupling member is rotated faster than the rotation of the crankshaft and the drive ratio between said output coupling member and said shaft means is less than 1 so that said shaft means rotates at a lower rotational speed than said output coupling member.

4. A drive as defined in claim 3 wherein said output coupling member comprises a housing member having blower blades mounted thereon which effect a flow of air as said output coupling member rotates.

5. A drive for rotating a cooling fan accessory from a crankshaft of an engine, said drive comprising shaft means drivingly connected with said cooling fan accessory to exect rotation of said fan accessory upon rotation thereof, a fluid coupling having relatively rotatable input and output coupling members rotatable about a common axis spaced from the axis of rotation of said shaft means, means for driving said input coupling member from the engine crankshaft at a ratio greater than 1 so that said input coupling member rotates at a speed in excess of said crankshaft, and means for drivingly connecting the output member of said coupling with said shaft means to effect rotation of said shaft means at a speed lower than the speed of rotation of said output coupling member.

6. A drive for a cooling fan for an engine as defined in claim 5 further including a water pump impeller drivingly connected with said shaft means.

7. A drive as defined in claim 6 wherein said fluid coupling comprises a viscous shear fluid coupling and said input and output coupling members define a viscous fluid shear chamber therebetween which is adapted to receive viscous shear fluid for transmitting torque between said coupling members.

8. A drive as defined in claim 5 wherein said output coupling member includes a plurality of blower blade fin members supported thereon which create a flow of air upon rotation thereof.

9. A drive as defined in claim 8 wherein said coupling member is mounted in association with an engine mounted alternator having an input drive shaft rotatable about an axis which is common to the axis of rotation of said input and output coupling members, and drive means for effecting rotation of said alternator input drive shaft and said input coupling member at substantially the same rotational speed.

10. A drive comprising a viscous fluid coupling having an input coupling member and an output coupling member rotatable about a common axis, said input and output coupling members defining a viscous shear fluid chamber therebetween and a viscous fluid located therein transmitting torque between said input and output coupling members, said output coupling member having a drive connection to be drivingly connected with an engine accessory, an alternator having an input drive shaft, means supporting and drivingly connecting said alternator input drive shaft and said input coupling member for effecting rotation of said alternator input drive shaft and said input coupling member about a common axis and at substantially the same rotational speed including a drive element drivingly connected with said alternator drive shaft and said input coupling member, said output coupling member being drivingly connected with a fan accessory for effecting rotation of said fan accessory to produce an air stream, and said viscous coupling and said alternator being mounted within said air stream.

11. A drive as defined in claim 10 wherein said alternator input drive shaft is drivingly connected to an input rotatable drive element drivingly connected to said input member and rotatable about an axis common with the axis of rotation of said alternator input drive shaft.

References Cited

UNITED STATES PATENTS

| 2,100,076 | 11/1937 | Gilmore. | |
| 2,612,249 | 9/1952 | Horn. | |
| 2,860,519 | 11/1958 | Cavanaugh. | |
| 2,911,961 | 11/1959 | McRae | 123—41.11 |
| 2,917,937 | 12/1959 | Dodge | 123—41.12 X |
| 2,948,268 | 8/1960 | Roper et al. | 123—41.11 |
| 2,981,122 | 4/1961 | Kelly. | |
| 3,048,056 | 8/1962 | Wolfram | 74—722 X |

FOREIGN PATENTS 138,759  1/1953  Sweden.

AL LAWRENCE SMITH, Primary Examiner

U.S. Cl. X.R.

123—41.31, 41.46, 41.49, 195, 198; 192—58, 113; 290—1